US011848861B2

(12) United States Patent
Mutairi et al.

(10) Patent No.: US 11,848,861 B2
(45) Date of Patent: Dec. 19, 2023

(54) MULTIPROTOCOL LABEL SWITCHING (MPLS) TRAFFIC ENGINEERING DESIGN FOR IP MULTIMEDIA SUBSYSTEM-BASED VOICE OVER INTERNET PROTOCOL

(71) Applicant: Saudi Arabian Oil Company, Dhahran (SA)

(72) Inventors: Baraka H. Mutairi, Dhahran (SA); Kashif Khawaja, Dhahran (SA); Majed Shukri, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 168 days.

(21) Appl. No.: 17/140,227

(22) Filed: Jan. 4, 2021

(65) Prior Publication Data
US 2022/0217083 A1 Jul. 7, 2022

(51) Int. Cl.
*H04L 45/50* (2022.01)
(52) U.S. Cl.
CPC .................. *H04L 45/50* (2013.01)
(58) Field of Classification Search
CPC ..... H04L 45/50; H04L 12/4633; H04L 65/80; H04L 65/1016
See application file for complete search history.

(56) References Cited

U.S. PATENT DOCUMENTS

| 8,442,030 | B2 | 5/2013 | Dennison |
| 8,599,865 | B2 | 12/2013 | Venkataswami et al. |
| 8,699,457 | B2 | 4/2014 | Venkataswami et al. |
| 9,167,501 | B2 | 10/2015 | Kempf et al. |
| 9,288,276 | B2 | 3/2016 | Adamczyk et al. |
| 9,780,909 | B2 | 10/2017 | Wood et al. |
| 9,979,595 | B2 | 5/2018 | Choudhury et al. |
| 2009/0268720 | A1* | 10/2009 | Veenstra ............. H04L 65/1063 709/227 |

(Continued)

FOREIGN PATENT DOCUMENTS

WO WO 2019071377 4/2019

OTHER PUBLICATIONS

Boyle et al., "Applicability statement for traffic engineering with MPLS," The Internet Society, 2002, 14 pages.

(Continued)

*Primary Examiner* — Donald L Mills
(74) *Attorney, Agent, or Firm* — Fish & Richardson P.C.

(57) ABSTRACT

Methods for Multiprotocol Label Switching (MPLS) Traffic Engineering (TE) design for IP Multimedia Subsystems (IMS) include determining that a network is a flat MPLS-enabled Voice over Internet Protocol (VoIP) or Unified Communications IMS network including an IMS Core site and excluding Session Border Controllers (SBCs). The network further includes multiple user endpoints (UEs). Responsive to determining that the network is a flat MPLS-enabled VoIP or Unified Communications IMS network, the computer system configures a first set of TE LSPs between each UE and the IMS Core site. The computer system configures a second set of TE LSPs between each UE and each other UE of the plurality of UEs to form a full mesh. A display device of the computer system generates a graphical representation of the network. The graphical representation represents the first set of TE LSPs and the second set of TE LSPs connecting each UE.

20 Claims, 10 Drawing Sheets

(56) References Cited

U.S. PATENT DOCUMENTS

| | | | |
|---|---|---|---|
| 2012/0218924 A1 | 8/2012 | Bhalla | |
| 2014/0036910 A1 | 2/2014 | Agmon et al. | |
| 2014/0160918 A1* | 6/2014 | Veerappagowda | H04L 45/507 370/244 |
| 2015/0207677 A1* | 7/2015 | Choudhury | H04L 41/0806 370/254 |
| 2016/0094398 A1* | 3/2016 | Choudhury | H04L 45/42 370/254 |
| 2018/0097725 A1* | 4/2018 | Wood | H04L 45/02 |
| 2018/0145929 A1* | 5/2018 | Wang | H04L 45/021 |
| 2018/0287929 A1* | 10/2018 | Means | H04L 12/4633 |
| 2020/0028900 A1* | 1/2020 | Rice | H04W 24/02 |
| 2020/0259872 A1 | 8/2020 | Khawaja et al. | |
| 2022/0021600 A1* | 1/2022 | Menon | H04L 41/5009 |

OTHER PUBLICATIONS

Saika et al., "IP Multimedia subsystem (IMS) architecture and management function for MPLS-based QoS," International Review on Computers and Software, 2007, 20, 7 pages.

Zelenika et al., "Network building clocks of fixed NGN telecom operator," 9th International Conference on Telecommunications, Jun. 2007, 8 pages.

PCT International Search Report and Written Opinion in International Appln. No. PCT/US2022/011166, dated Apr. 4, 2022, 16 pages.

* cited by examiner

MULTIPROTOCOL LABEL SWITCHING (MPLS) TRAFFIC ENGINEERING DESIGN FOR IP MULTIMEDIA SUBSYSTEM-BASED VOICE OVER INTERNET PROTOCOL

TECHNICAL FIELD

This description relates generally to network design, for example, to Multiprotocol Label Switching (MPLS) Traffic Engineering (TE) design for IP Multimedia Subsystem (IMS)-based Voice over Internet Protocol (VoIP).

BACKGROUND

Rapid communication between and within industrial facilities, such as for hydrocarbon extraction, processing, or storage can be critical. Disruptions or extended delays occurring between Voice over Internet Protocol (VoIP) telephones and servers can result in dropped emergency calls, such as in a hydrocarbon processing facility. Dropped Internet Protocol (IP) traffic can also cause the quality of voice data to be significantly degraded. Such disruptions are undesirable, especially when the call is of an emergency nature.

SUMMARY

Methods, systems, and apparatus for Multiprotocol Label Switching (MPLS) Traffic Engineering (TE) design for IP Multimedia Subsystem (IMS)-based Voice over Internet Protocol (VoIP) and Unified Communications are disclosed. A computer system determines that a network is a flat MPLS-enabled VoIP or Unified Communications IMS network including an IMS Core site and excluding Session Border Controllers (SBCs). The network further includes multiple user endpoints (UEs). Responsive to determining that the network is a flat MPLS-enabled VoIP or Unified Communications IMS network, the computer system configures a first set of TE LSPs between each UE and the IMS Core site. The computer system configures a second set of TE LSPs between each UE and each other UE of the plurality of UEs to form a full mesh. A display device of the computer system generates a graphical representation of the network, the graphical representation representing the first set of TE LSPs and the second set of TE LSPs connecting each UE of the plurality of UEs.

In some implementations, the computer system determines that the network includes multiple IMS Core sites including the IMS Core site. Responsive to determining that the network includes the multiple IMS Core sites, the computer system configures a third set of TE LSPs between each IMS Core site and each other IMS Core site of the multiple IMS Core Sites to form a second full mesh.

In some implementations, the computer system configures a fourth set of TE LSPs between each UE of the multiple UEs and each IMS Core site of the multiple IMS Core sites.

In some implementations, the computer system receives a specified latency, induced jitter, and number of hops for a particular traffic type across the network. The first set of TE LSPs and the second set of TE LSPs are configured to support the specified latency, induced jitter, and number of hops.

In some implementations, at least one UE of the multiple UEs is a mobile device and the particular traffic type includes Voice over Internet Protocol (VoIP) data or Unified Communications data.

In some implementations, the computer system directs data from a first UE to a second UE of the multiple UEs using a path label indicating the second set of TE LSPs.

In some implementations, each UE of the multiple UEs is homed to a respective first provider edge (PE) and the IMS Core site is homed to a second PE. Configuring the first set of TE LSPs includes connecting, by the computer system, the respective first PE of each UE and the second PE of the IMS Core site.

DETAILED DESCRIPTION

The implementations disclosed provide methods, apparatus, and systems for Multiprotocol Label Switching (MPLS) Traffic Engineering (TE) design for IP Multimedia Subsystem (IMS)-based Voice over Internet Protocol (VoIP). In particular, systems and methods for implementing additional quality of service (QoS) measures and quicker failover mechanisms at the network layer are designed. The implementations are performed using MPLS Traffic Engineering Labeled Switching Paths (LSPs). The MPLS Layer-3 virtual private network (VPN) technology is used to enhance the QoS and redundancy assurances for a 3rd Generation Partnership Project (3GPP) IMS-based VoIP network with geographically redundant core call processing sites in an Enterprise network.

Among other benefits and advantages, the methods provide a flexible and integrated framework for MPLS TE design for IMS-based VoIP networks and Unified Communications networks. Using the MPLS Layer-3 VPN technology enhance the QoS and redundancy assurances for a 3GPP IMS-based VoIP network with geographically redundant core call processing sites in an Enterprise network. The implementations benefit from the MPLS Traffic Engineering LSP feature-set, thus improving performance and reliability. Particular TE LSPs are carved out, thereby avoiding suboptimal network nodes or links. Moreover, the need for specific parameters to create the TE LSPs is obviated.

Figure 1:
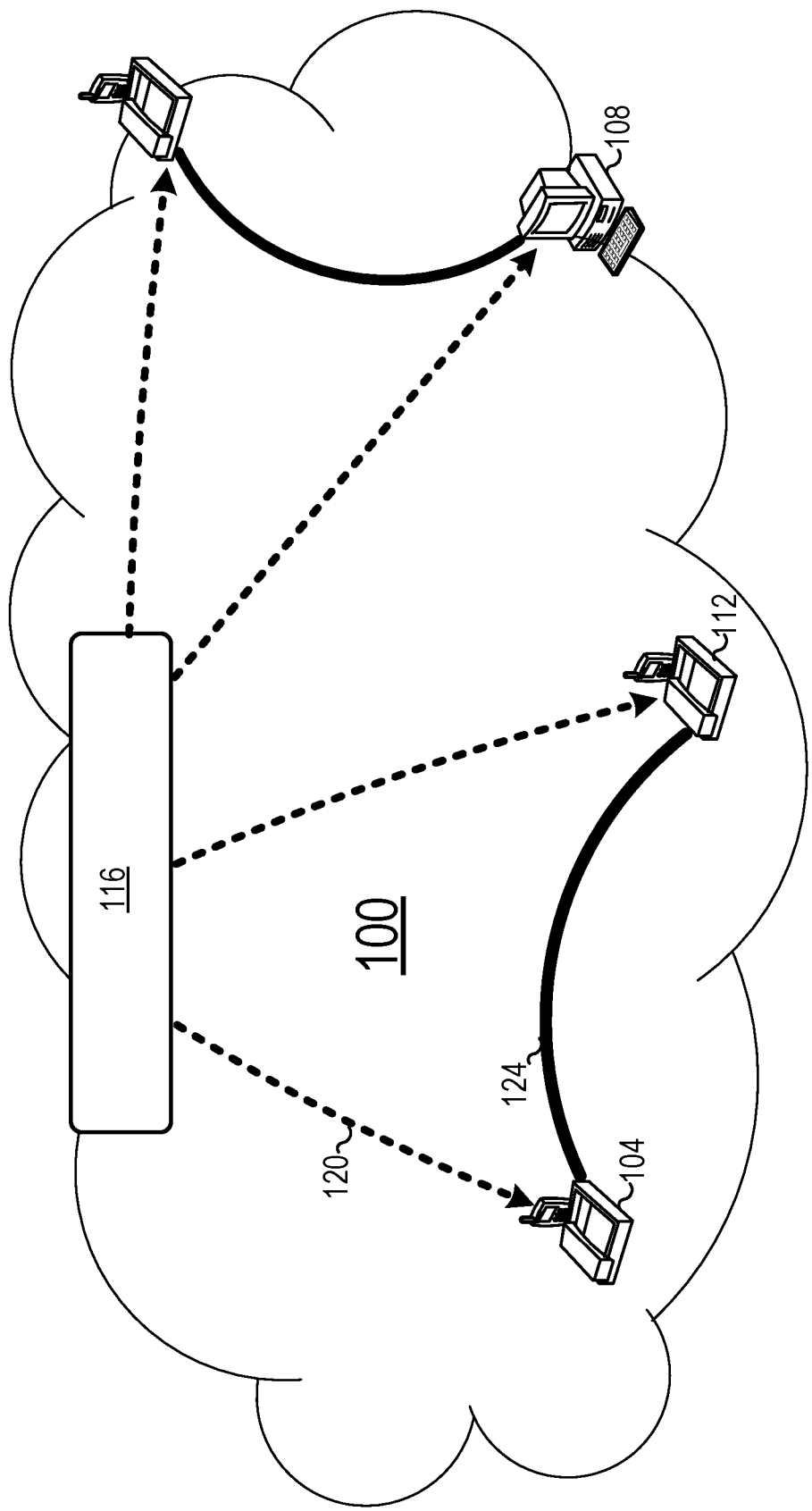
FIG. 1 illustrates an example internet protocol (IP) network, in accordance with one or more implementations.

FIG. 1 illustrates an example internet protocol (IP) network 100, in accordance with one or more implementations. IP refers to a principal communications protocol in the Internet protocol suite for relaying datagrams across network boundaries. The routing functions of network 100 enable internetworking and delivering packets from a source host (for example, IP phone 104) to a destination host (for example, personal computer soft client 108) based on IP addresses in the packet headers. A VoIP phone or IP phone uses VoIP technologies for placing and transmitting telephone calls over an IP network, such as the Internet, instead of the traditional public switched telephone network (PSTN). The personal computer (PC) soft client 108 shown in FIG. 1 operates a software-based VoIP phone. IP defines packet structures that encapsulate the data to be delivered and defines addressing methods that are used to label a datagram with source and destination information.

In some implementations, in an IMS-based VoIP network the IP phones 104, 112 communicate with a variety of servers 116 for process signaling (setting up) of phone calls and process media generation (audio or video generated by users). For example, the servers 116 represent IMS Core components and application servers. IMS refers an architectural framework for delivering IP multimedia services. IMS is sometimes referred to as "IP Multimedia Core Network Subsystem." Referring to FIG. 1, the path 120 shows the messaging flows (sometimes referred to as "call signaling") to establish a call. The path 124 shows the audio or video (or other) media, which flows once the call is established. For example, the user endpoints (UE), for example, IP phone 104, communicate with the IMS Core site (servers 116) for call processing (that is, setting up a call) and subsequently, communicate with other UEs (IP phone 108) for media (voice or video). A user endpoint can also be a mobile device, such as a smartphone or tablet.

Figure 2:
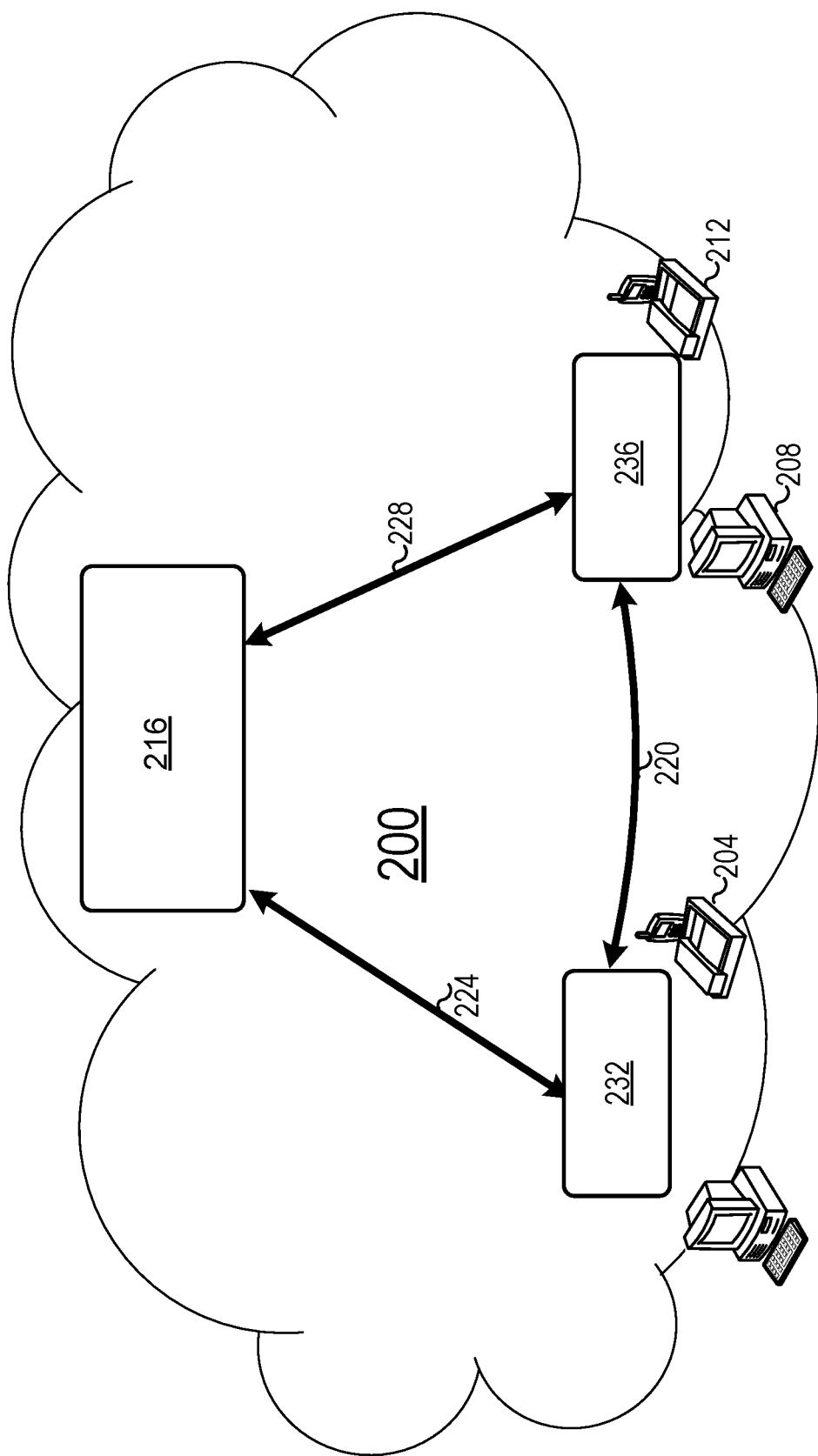
FIG. 2 illustrates an example Multiprotocol Label Switching (MPLS)-enabled Layer3 virtual private network (VPN), in accordance with one or more implementations.

FIG. 2 illustrates an example MPLS-enabled Layer3 VPN 200, in accordance with one or more implementations. MPLS refers to a routing method in telecommunications networks that directs data from one node to the next based on short path labels rather than long network addresses, thus avoiding complex lookups in a routing table and speeding IP traffic flows. Layer3 refers to the network layer in the seven-layer Open Systems Interconnection (OSI) model of computer networking. Layer 3 is responsible for packet forwarding including routing through intermediate routers. A VPN extends a private network across a public network and enables users to send and receive data across shared or public networks as if the computing devices were directly connected to the private network. The network 200 can include or a VoIP or Unified Communications IMS network. A VoIP network uses IP telephony and incorporates a set of technologies for delivering voice communications and multimedia sessions over Internet Protocol networks, such as the Internet. VoIP is described in more detail with reference to FIG. 1. IMS is also described in more detail with reference to FIG. 1. Unified communications refers to integrating enterprise communication services, for example, instant messaging, presence information, voice, or mobility features.

In some implementations, additional quality of service (QoS) measures and quicker failover mechanisms are implemented at the network layer (Layer3). QoS refers to management and measurement of data traffic to reduce measures, such as packet loss, latency, or jitter on the network. QoS controls and manages network resources by setting priorities for specific types of data on the network. Failover mechanisms refer to backup operational modes in which the functions of a system component (such as a processor, server, network, or database, for example) are assumed by secondary system components when the primary component becomes unavailable through either failure or scheduled down time.

In some implementations, the additional QoS measures and failover mechanisms are implemented using MPLS Traffic Engineering (TE) Labeled Switching Paths (LSPs). TE refers to an aspect of Internet network engineering dealing with the issue of performance evaluation and performance optimization of operational IP networks. For example, TE encompasses the application of technology and scientific principles to the measurement, characterization, modeling, and control of Internet traffic. LSP refers to a path through an MPLS network, set up by the network management system (NMS) or by a signaling protocol such as Label Distribution Protocol (LDP), Resource Reservation Protocol-Traffic Engineering (RSVP-TE), or Border Gateway Protocol (BGP). NMS refers to an application or set of applications that manages a network's independent components inside a larger network management framework. LDP refers to a protocol in which routers capable of MPLS exchange label mapping information. RSVP-TE refers to an extension of the RSVP for traffic engineering. BGP refers to a standardized exterior gateway protocol designed to exchange routing and reachability information between autonomous systems (AS) on the Internet.

The TE LSPs are configured to provide a prioritized pre-determined end-to-end path through an MPLS-based IP network for some or all IP traffic. Since VoIP is implemented as real-time IP traffic, a disruption, while generally unnoticeable by regular Internet applications, is readily perceived by users. Hence, in particular situations, a path is carved out through the network to get the voice (or video and other real-time) IP traffic from source, for example, IP phone 204, to destination, for example, IP phone 212 while also ensuring that the VoIP data is not impeded by other less significant applications or even that VoIP data is not adversely affected by low quality network links.

In the IMS-based VoIP implementations disclosed, critical flows occur between the UEs, for example, IP phones 204, 212 and the IMS Core site 216 via call signaling and also between the various UEs, for example IP phone 204 and PC 208 for media, such as voice or video. The IMS Core site 216 is sometimes referred to as a unified communications application server." If a disruption or extended delay occurs between a UE (IP phone 204) and the IMS Core site 216, a call may not even establish much less be delayed. Such dropped calls can include emergency calls, such as in a hydrocarbon extraction, processing or extraction facility. If traffic on the path 220 between two UEs is dropped, the quality of voice can be significantly degraded to the extent that either or both or all parties may not be able to discern speech, video, or other multimedia, essentially making the call useless. Such a drop in quality would be highly undesirable when the call is of an emergency nature.

Referring to FIG. 2, a cause of disruption or delay can be faulty routers or devices, low-bandwidth links or low-quality (faulty) links. If a particular segment of the network path is suboptimal, the segment is a candidate to be avoided when stitching an end-to-end path for real-time IP traffic. In the implementations disclosed, the segment is avoided by configuring a set of pre-defined network paths 220, 224, 228 using MPLS TE LSPs.

In some implementations, each UE subnet is homed to a provider edge (PE) router. For example, the UE subnet 232 is homed to a PE router that is used for the network path (TE LSP) connections to the UE subnet 236. A PE or PE router refers to a router between one network service provider's area and other areas administered by other network providers, or a router between one network service provider's area and another area administered by the same network service provider but as a separate area. For example, the network paths (TE LSPs) 220, 224, 228 are established between PEs of all the UE subnets, for example, for VoIP traffic between the PC 208 and IP phone 204 (media traffic, such as voice or video) on network path 220 and between the PEs of UE subnets (IP phone 204) and a PE of the IMS Core site 216 on network path 224 for non-media, or voice or video signaling IP traffic, as shown in FIG. 2. Each IMS Core site 216 is also homed to a separate PE. A subnet refers to a subnetwork or logical subdivision of an IP network. IP phones and PCs that belong to a subnet are addressed with an identical most-significant bit-group in their IP addresses. For example, the PC 208 and IP phone 212 belong to subnet 236. Each subnet is homed by a PE router within a Service Provider core network. In some implementations, an endpoint device (for example, the UE 232 or IMS Core Site 216) is directly attached to a PE. In other implementations, one or more (non-MPLS) routers can be downstream. In most implementations, however, the proximity of the endpoint devices to the PE obviates the need for significant (and potentially costly) quality control measures downstream of the PE. In such implementations, the PEs within an MPLS network originate the advertisement of a subnet in the MPLS domain.

The network paths 220, 224, 228 are built using the link and node protection mechanisms for quick healing in case of a network node or link failure. Link protection helps to ensure that IP traffic going over a specific interface to a neighboring router or switch can continue to reach this router (switch) if that interface fails. When link protection is configured for an interface and an LSP that traverses this interface, a bypass LSP is created that will handle this IP traffic if the interface fails. Node protection extends the capabilities of link protection. Node protection ensures that IP traffic from an LSP traversing a neighboring router can continue to reach its destination even if the neighboring router fails. In some implementations, the network paths establish a flat network (shown in FIG. 2) connecting the UEs (for example, IP phone 204) and the IMS Core site 216. For example, the network paths in this flat implementation would include the network paths 224, 228. In the flat network, a UE subnet 232, using its PE, communicates directly with the IMS Core site 216 (for signaling) on network path 224 and with another UE subnet 236 (for media transfer) on network path 220.

Figure 3:
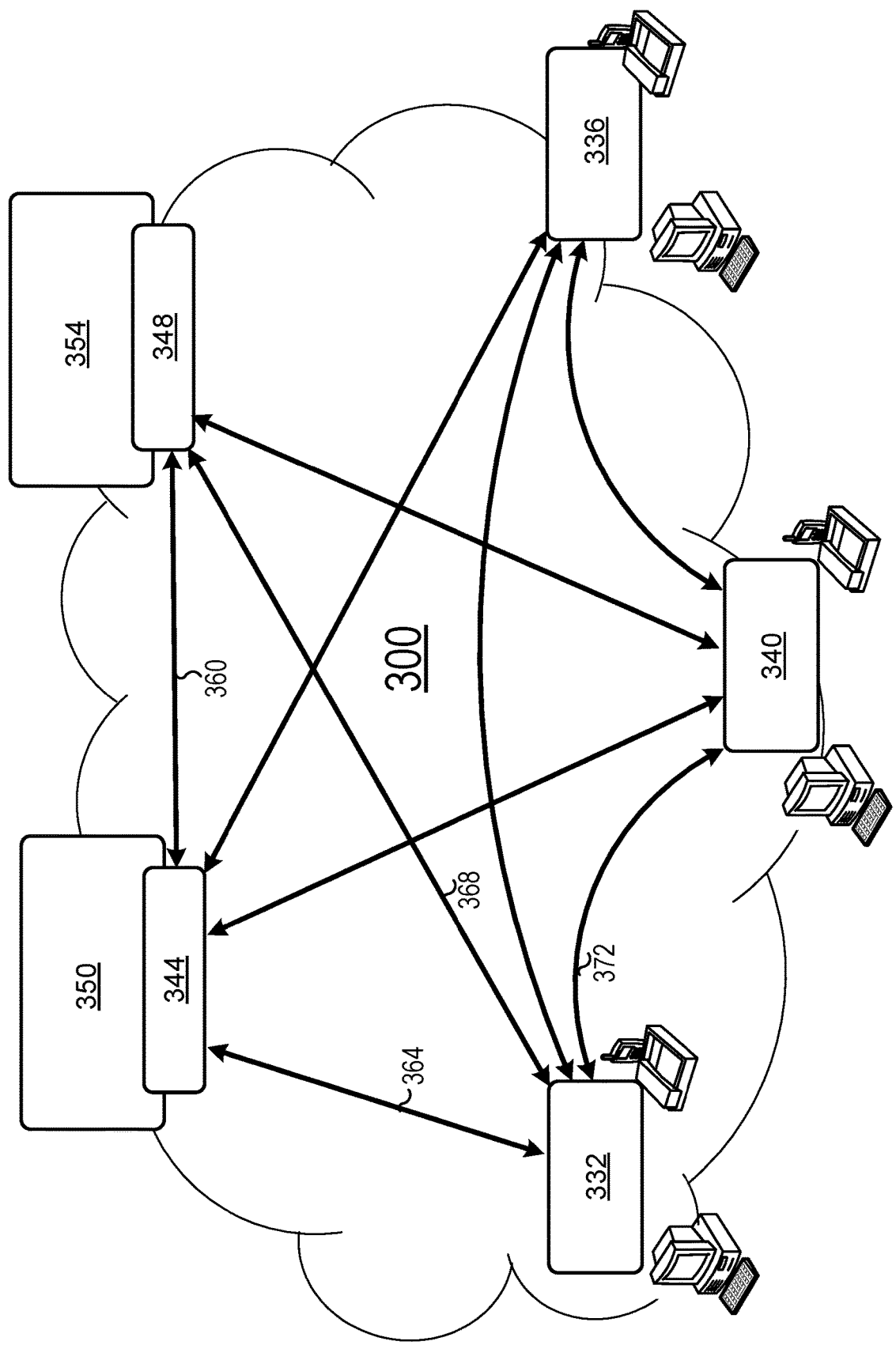
FIG. 3 illustrates an example MPLS-enabled Layer3 VPN having redundant IP Multimedia Subsystem (IMS) Core sites, in accordance with one or more implementations.

FIG. 3 illustrates an example MPLS-enabled Layer3 VPN 300 having redundant IMS Core sites 350, 354, in accordance with one or more implementations. MPLS-enabled networks and IMS Core sites are illustrated and described in more detail with reference to FIG. 2. A UE subnet, for example, the PE for subnet 332, can be configured to connect to a single (IMS Core site 350) or multiple redundant IMS Core sites 350, 354 directly. Subnets are illustrated and described in more detail with reference to FIG. 2. In some implementations, a TE LSP network path 360 is configured between all the IMS Core sites, for example, IMS Core sites 350, 354 (sometimes referred to as "full mesh.") TE LSPs are illustrated and described in more detail with reference to FIG. 2.

A TE LSP network path (e.g., TE LSP network path 364) is configured between a UE-PE and each IMS Core site the UE-PE is configured to use. PEs are illustrated and described in more detail with reference to FIG. 2. For example, the TE LSP network path 364 is configured between UE subnet 332 and IMS Core site 350 (PE 344). The TE LSP network path 368 is configured between UE subnet 332 and IMS Core site 354 (PE 348). A TE LSP network path (e.g., the TE LSP network path 372) is also configured between each UE-PE and each other UE-PE. Thus, a full mesh is configured between each UE-PE pair. For example, the TE LSP network path 372 is configured between UE subnet 332 and UE subnet 340. The implementations shown in FIG. 3 can be extrapolated to any (N) number of IMS Core sites. Furthermore, a PE can home multiple UE subnets.

In some implementations, a computer system determines that the network 300 is a flat MPLS-enabled network including a single IMS Core site 350. An example computer system is illustrated and described in more detail with reference to FIG. 9. The network excludes Session Border Controllers (SBCs). Example SBCs 420, 424 are illustrated and described in more detail with reference to FIG. 4. The network 300 further includes multiple UEs 332, 340 as shown in FIG. 3. Responsive to determining that the network 300 is a flat MPLS-enabled network, the computer system configures a first TE LSP (e.g., the network path 364) between each UE (for example, the UE 332) of the multiple UEs 332, 340 and the single IMS Core site 350. In some implementations, the computer system configures a second TE LSP (for example, the network path 372) between each UE 332 and each other UE 340 of the multiple UEs 332, 340 to form a full mesh. A display device of the computer system generates a graphical representation of the network 300. An example display device 924 is illustrated and described in more detail with reference to FIG. 9. The graphical representation displays the first LSP 364 and the second LSP 372 connecting each UE 332 of the multiple UEs 332, 340.

In some implementations, the computer system determines that the network 300 includes multiple IMS Core sites 350, 354 including the single IMS Core site 350. Responsive to determining that the network 300 includes the multiple IMS Core sites 350, 354, the computer system configures a third TE LSP 360 between each IMS Core site 350 and each other IMS Core site 354 of the multiple IMS Core Sites 350, 354 to form a second full mesh. In some implementations, the computer system configures a fourth TE LSP 368 between each UE 332 of the multiple UEs 332, 340 and each IMS Core site 354 of the multiple IMS Core Sites 350, 354.

In some implementations, the computer system receives a specified latency, induced jitter, and number of hops for a particular IP traffic type across the network 300. The latency refers to a one-way latency (the time from the source sending a packet to the destination receiving it), a round-trip delay time (the one-way latency from source to destination plus the one-way latency from the destination back to the source), a delay between when an audio signal enters and when it emerges from the network 300, or a degree of delay between the time a transfer of a video stream is requested and the actual time that transfer begins. The induced jitter refers to a variability over time of the network latency. For example, the jitter is induced by millions of network connections trying to use the same network 300. The number of hops refers to a number of intermediate network devices through which data must pass between source and destination. The first set of TE LSPs and the second set of TE LSPs are configured to support the specified latency, induced jitter, and number of hops.

In some implementations, at least one UE 332 of the multiple UEs 332, 340 is a mobile device, for example, a smartphone or a tablet. The particular IP traffic type can include VoIP data or Unified Communications data. Using traditional methods, mobile devices provide voice call services over a circuit-switched-style network. In the implementations disclosed herein, the mobile devices provide VoIP calling strictly over an IP packet-switched network. The IMS architectural framework provides methods of delivering voice (VoIP) and other multimedia services on smartphones. In some implementations, the computer system directs data from a first UE 332 to a second UE 340 of the multiple UEs 332, 340 using a path label indicating the second TE LSP. The MPLS-enabled network 300 thus directs data from one node to the next based on short path labels rather than long network addresses, avoiding complex lookups in a routing table and speeding up IP traffic flow. The path labels identify virtual links (paths) between nodes rather than endpoints.

In some implementations, the single IMS Core site 350 is homed to a provider edge (PE) 344. A PE or PE router refers to a router between one network service provider's area and areas administered by other network providers. Configuring the first TE LSP 364 between the UE 332 and the single IMS Core site 350 includes connecting, by the computer system, the first TE LSP 364 between the UE 332 and the PE 344 of the single IMS Core site 350. As described in more detail with reference to FIG. 2, in some implementations, LSPs are configured between PEs. For example, the TE LSP 364 is configured between the PE 344 and a PE on the UE 332 side. The devices (UE 332) being connected by the TE LSP 364 resides behind the PE. In other words, the UE 332 is essentially homed to the PE. Moreover, the UE 332 is part of a subnet. The subnet is homed to the PE. An LSP thus originates from or terminates on a PE. Hence, the IP network 300 is an MPLS-enabled network, and the LSPs (network paths) referred to in this specification are configured to/from a PE to which a device (IMS Core site, UE subnet, or SBC) is being used for.

Figure 4:
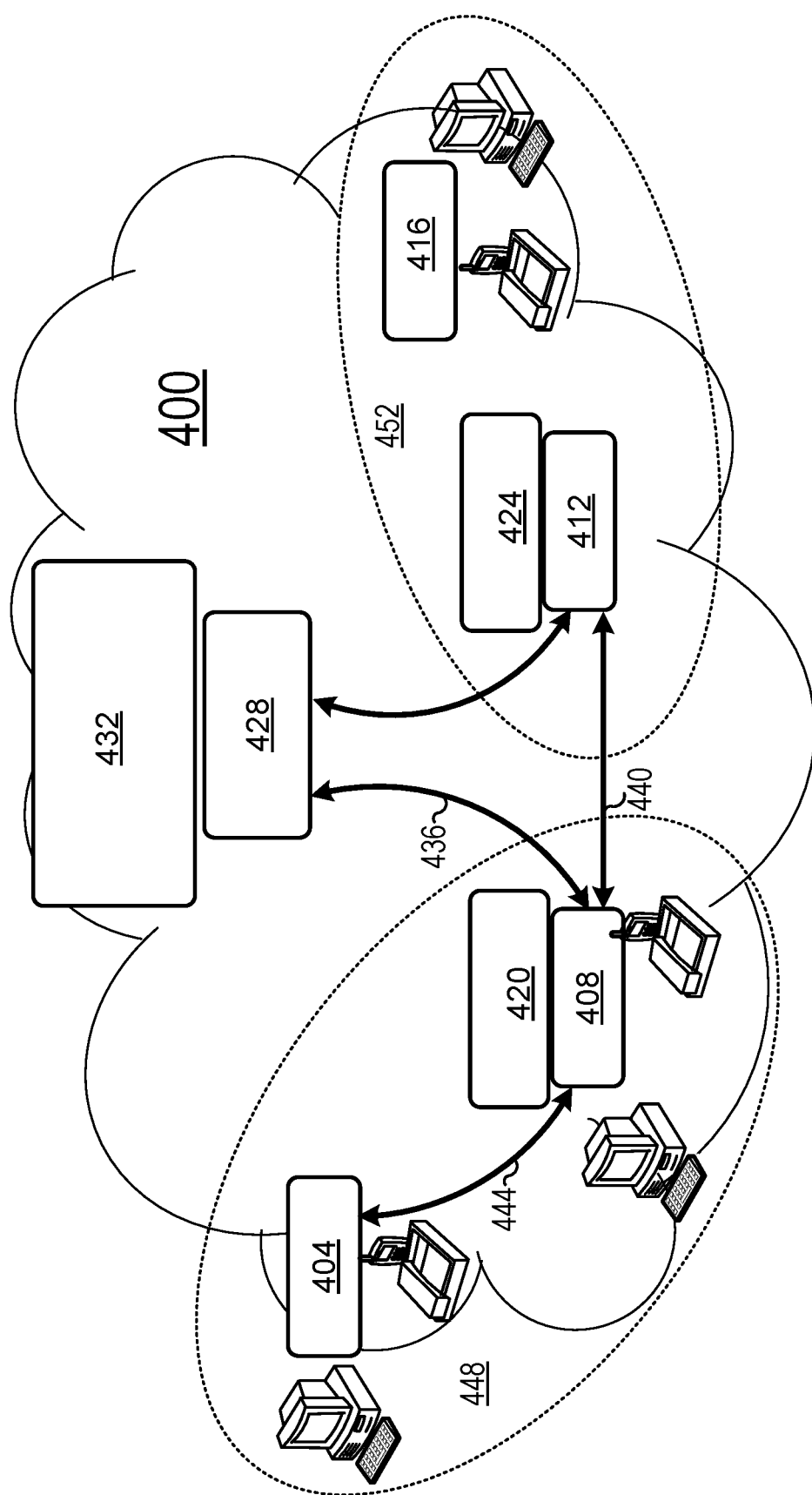
FIG. 4 illustrates a hierarchical MPLS-enabled Layer3 VPN, in accordance with one or more implementations.

FIG. 4 illustrates a hierarchical MPLS-enabled Layer3 VPN 400, in accordance with one or more implementations. MPLS-enabled networks and subnets are illustrated and described in more detail with reference to FIG. 2. The network 400 is hierarchical, that is, it is divided into discrete layers 448, 452. Each layer, or tier, in the hierarchy provides specific functions that define the layer's role within the overall network. In some implementations, the layers 448 and 452 are the same layer (Access layer). An example access layer is illustrated and escribed in more detail with reference to FIG. 10. The purpose of the access layer is to separate the direction of interaction of the UEs with the IMS Core sites. which in turn decreases the total number of TE LSPs required. Resources are thus conserved. For example, in the flat network 200 design, illustrated and described in more detail with reference to FIG. 2, the total number of LSPs configured can increase quickly as the network 200 grows in size. The implementations described herein thus create two levels in the hierarchy: one below the SBCs ("Access Network" side) and one above the SBCs ("Core Network" side). The layers 448 and 452 both belong to the Access Network side. In such implementations, the UEs communicate only with the SBCs. The SBCs communicate with the rest of the IMS network and with other SBCs. This allows the implementations disclosed herein to optimize and select the right network hardware, software, and features to perform specific roles for each network layer 448, 452.

In some implementations, a computer system determines that a network is a hierarchical MPLS-enabled network including a single IMS Core site and multiple Session Border Controllers (SBCs). To improve the scalability of the implementations, especially for large network footprints, SBCs 420, 424 are deployed. An SBC refers to a network element deployed to protect Session Initiation Protocol (SIP)-based VoIP networks. SIP refers to a signaling protocol used for initiating, maintaining, and terminating real-time sessions that include voice, video and messaging applications. The hierarchical MPLS-enabled Layer3 VPN 400 shown in FIG. 4 can include a large number of UE subnets spread across many MPLS PEs 404, 408, 412, 416. PEs and subnets are illustrated and described in more detail with reference to FIG. 2. To improve scalability in terms of the administrative overhead for the MPLS network operators (maintaining an inordinate number of LSPs), in some implementations, the UEs are front-ended using one (primary) or more (as backups) SBCs 420, 424. The SBCs can be deployed as close to UEs as desired and in an appropriate geographical scheme or any other fashion that fits the network enterprise. All signaling and media for the UEs is anchored by the SBCs. Example SBCs are further illustrated and described in reference to FIG. 10.

In some implementations, TE LSPs are configured between PEs of all the IMS Core sites (full mesh) as illustrated and described in more detail with reference to FIG. 3. IMS Core sites and TE LSPs are illustrated and described in more detail with reference to FIG. 2. Additional TE LSPs are configured between a PE of an SBC (for example, SBC 420) and PEs of each IMS Core site (for example, IMS Core site 432) it uses. For example, the network path 436 is configured between SBC 420 (PE 408) and IMS Core cite 432 (PE 428). Additional TE LSPs are configured between each SBC 420 (PE 408) and each other SBC 424 (PE 412) to yield a full mesh. For example, the network path 440 is configured between SBCs 420, 424 (PEs 408, 412). Additional TE LSPs are configured between the UE-PEs and each SBC (SBC-PE) that the UEs are configured to use. For example, the network path 444 is configured between the PE 404 and the SBC 420 (PE 408).

The groupings 448, 452 depict a collection of subnets (homed to PEs) that are configured to use a particular SBC. For example, subnets behind PEs 404, 408 are configured to use SBC 420 while subnets attached to PEs 412, 416 are homed to SBC 424. Such implementations enable the flexibility of having the TE LSPs configured between (1) PE 408 and the IMS Core site 432 (PE 428); (2) PE 412 and the IMS Core site 432 (PE 428); (3) PE 408 and PE 412; (4) PE 404 and SBC 420 (PE 408); and (5) PE 416 and SBC 424 (PE 412). The implementations disclosed herein thus provide improved functionality in a VoIP network for voice and multimedia calling services for corporate users. The implementations enable the VoIP traffic path through the network 400 to recover faster to reduce disruption to multimedia real-time services provided by the IMS-based VoIP network. Higher quality end-to-end paths are configured through the MPLS network and allows for those paths to recover faster than a native IP network.

Figure 5:
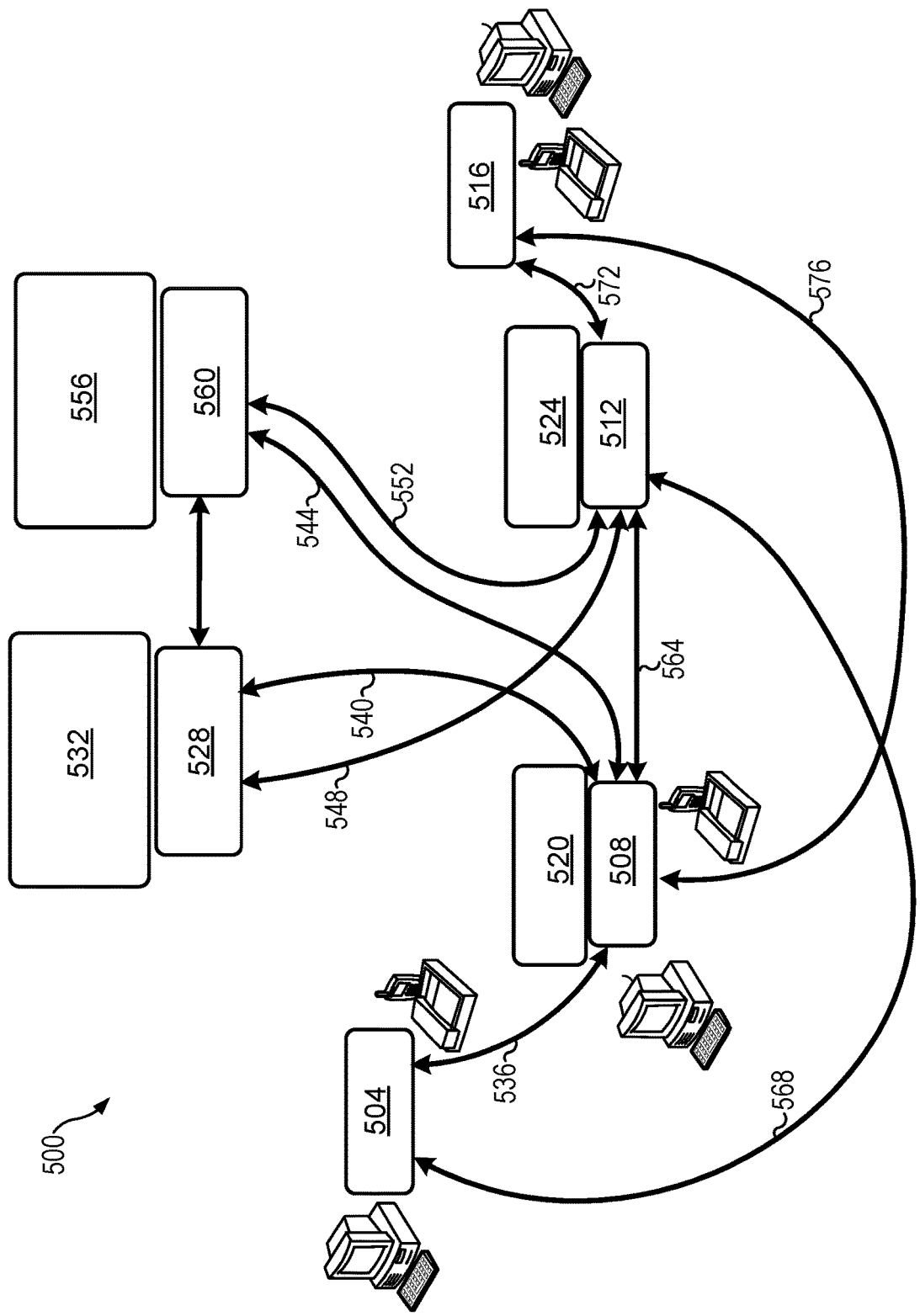
FIG. 5 illustrates a hierarchical MPLS-enabled Layer3 VPN having multiple IMS Core sites, in accordance with one or more implementations.

FIG. 5 illustrates a hierarchical MPLS-enabled Layer3 VPN 500 having multiple IMS Core sites 532, 556, in accordance with one or more implementations. MPLS-enabled networks and IMS Core sites are illustrated and described in more detail with reference to FIG. 2. The architecture for hierarchical MPLS-enabled Layer3 VPN can extrapolated to a topology where UEs are homed to redundant SBCs 520, 524 and to multiple redundant IMS Core sites 532, 556. SBCs are illustrated and described in more detail with reference to FIG. 4.

In some implementations, a TE LSP network path 536 is configured between PEs 504, 508. TE LSPs are illustrated and described in more detail with reference to FIG. 2. Additionally, a TE LSP network path 540 is configured between PEs 508, 528. Additionally, a TE LSP network path 544 is configured between PEs 508, 560. Additionally, a TE LSP network path 548 is configured between PEs 512, 528. Additionally, a TE LSP network path 552 is configured between PEs 512, 560. Additionally, a TE LSP network path 564 is configured between PEs 512, 508. Additionally, a TE LSP network path 568 is configured between PEs 512, 504. Additionally, a TE LSP network path 572 is configured between PEs 512, 516. Additionally, a TE LSP network path 576 is configured between PEs 508, 516. Additionally, a TE LSP (not labeled in FIG. 5) is configured between PEs 528, 560. The implementations disclosed thus configure TE LSPs and build a network scalable for Unified Communications or VoIP based on the 3GPP IMS architecture.

In some implementations, the number of TE LSPs is reduced further, thus conserving the use of network and hardware resources. For example, because of the proximity of SBCs to the UE-PEs that they serve, implementations can obviate the need for TE LSP network paths between the UE-PEs and the SBC-PEs, such as, in the case where a UE-PE has only a single link to get to the SBC (SBC-PE). In such cases, the overhead of configuring TE LSPs from the UE-PE to the SBC (SBC-PE) is obviated. The implementations disclosed thus introduce robustness in the VoIP network 500 by avoiding undesirable Layer3 network segments. The implementations also provide faster recovery of service during network failures and improved network resource allocation for IMS applications.

Figure 6:
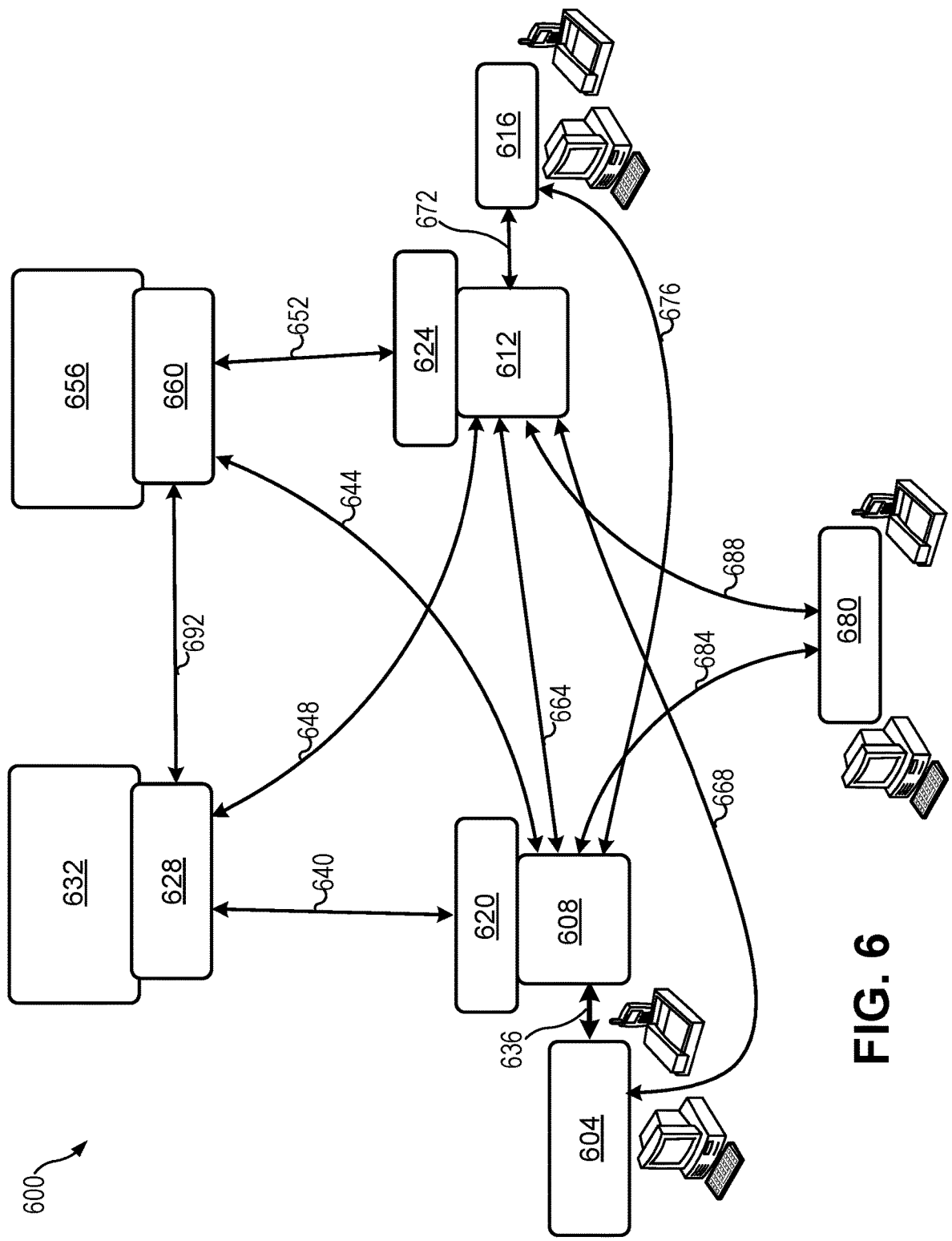
FIG. 6 illustrates a hierarchical MPLS-enabled Layer3 VPN having remote UE subnets, in accordance with one or more implementations.

FIG. 6 illustrates a hierarchical MPLS-enabled Layer3 VPN 600 having remote UE subnets, in accordance with one or more implementations. In inter-autonomous systems or carrier-supporting-carrier systems (sometimes referred to as "Inter-AS" or "CSC" topologies), the UE-PEs can be located in different or remote MPLS networks. An AS refers to a collection of connected IP routing prefixes under the control of one or more network operators on behalf of a single administrative entity or domain that presents a common, clearly defined routing policy to the Internet. CSC topologies refer to a hierarchical VPN architecture that allows service providers or customer carriers to connect their IP or MPLS networks over an MPLS backbone without building their own MPLS backbone. MPLS-enabled networks and subnets are illustrated and described in more detail with reference to FIG. 2. For topologies having remote subnets, TE LSPs are configured between a PE of a remote UE subnet (located in a second MPLS network) and a PE of an assigned SBC (in a first MPLS network). TE LSPs are illustrated and described in more detail with reference to FIG. 2. SBCs are illustrated and described in more detail with reference to FIG. 4. FIG. 6 shows an example network 600 having remote UE subnets on PE 680 homed to SBCs 620, 624 in a primary or backup redundancy setup.

In some implementations, TE LSP network path 636 is configured between PEs 604, 608. Additionally, TE LSP network path 640 is configured between PEs 608, 628. Additionally, TE LSP network path 644 is configured between PEs 608, 628. Additionally, TE LSP network path 648 is configured between PEs 608, 628. Additionally, TE LSP network path 652 is configured between PEs 612, 660. Additionally, TE LSP network path 664 is configured between PEs 612, 608. Additionally, TE LSP network path 668 is configured between PEs 612, 604. Additionally, TE LSP network path 672 is configured between PEs 612, 616. Additionally, TE LSP network path 676 is configured between PEs 608, 616. Additionally, TE LSP network path 684 is configured between PEs 608, 680. Additionally, TE LSP network path 688 is configured between PEs 612, 680. Additionally, TE LSP network path 692 is configured between PEs 628, 660. The implementations disclosed herein thus provide better QoS and faster recovery mechanisms than a native IP network.

Figure 7:
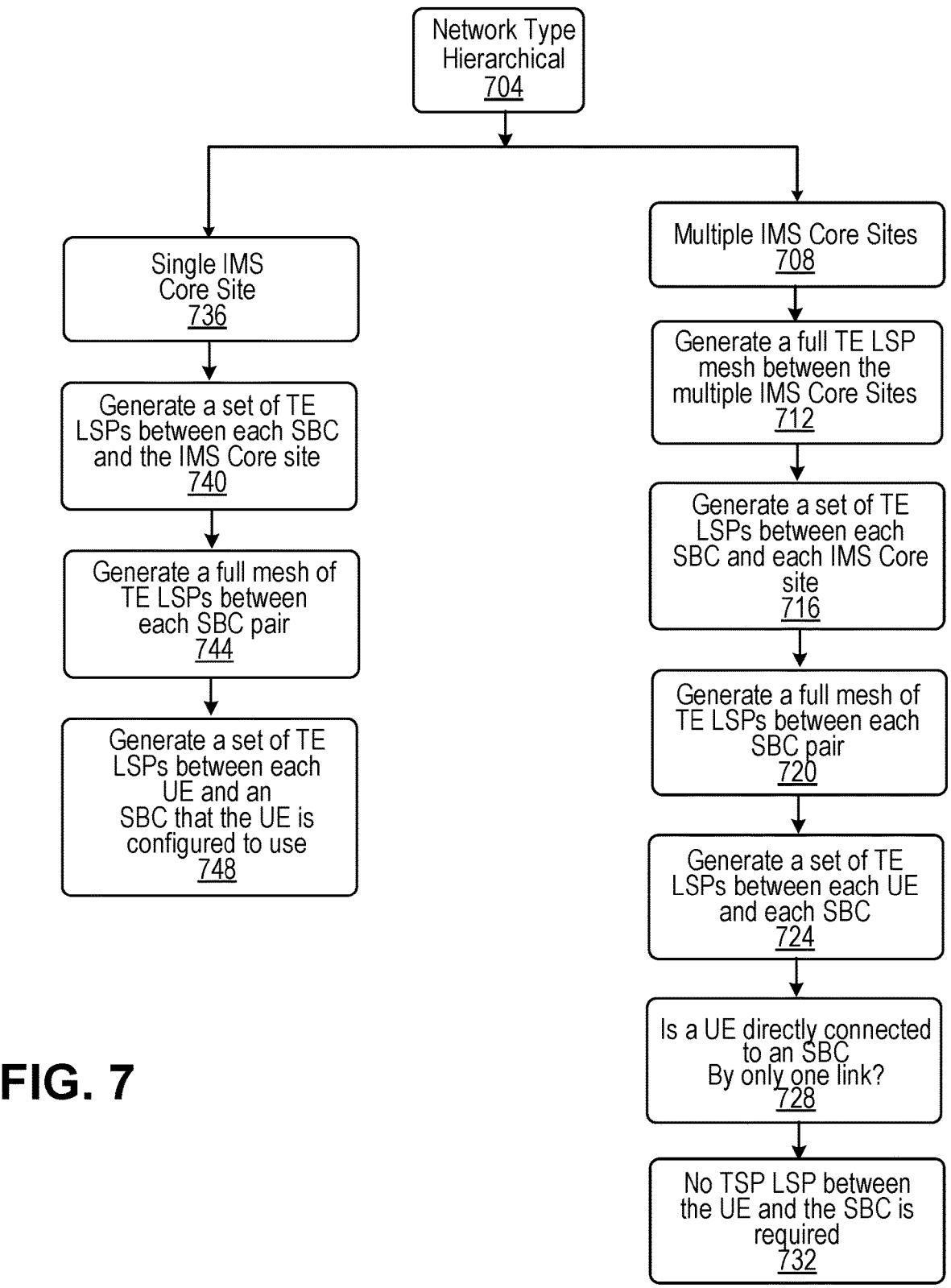
FIG. 7 illustrates a process for MPLS Traffic Engineering (TE) design for IMS-based Voice over Internet Protocol (VoIP), in accordance with one or more implementations.

FIG. 7 illustrates a process for MPLS Traffic Engineering design for IMS-based VoIP, in accordance with one or more implementations. MPLS-enabled networks and IMS Core sites are illustrated and described in more detail with reference to FIG. 2. In some implementations, the process is performed by the computer system illustrated and described in more detail with reference to FIG. 9.

In step 704, the computer system determines whether the network type of the network 600 is an MPLS-enabled hierarchical VoIP or Unified Communications IMS network. The hierarchical nature of the network 600 is a function of VoIP/IMS. Hierarchical networks are illustrated and described in more detail with reference to FIG. 4. The network 600 is illustrated and described in more detail with reference to FIG. 6. When the computer system determines that the network type is an MPLS-enabled hierarchical VoIP or Unified Communications IMS network, the computer system proceeds to step 708. In some implementations, the computer system determines that the network further includes multiple IMS Core sites including the single IMS Core Site. For example, in step 708, the computer system determines whether the network 600 includes multiple, redundant IMS Core sites (e.g., IMS Core sites 632, 656 illustrated and described in more detail with reference to FIG. 6). When the computer system determines that the network 600 includes multiple, redundant IMS Core sites, the computer system proceeds to step 712.

In step 712, the computer system configures multiple Traffic Engineering (TE) Label Switching Paths (LSPs) between PEs of the multiple, redundant IMS Core sites. TE LSPs are illustrated and described in more detail with reference to FIG. 2. In some implementations, the computer system configures a set of TE LSPs between a PE of each IMS Core site of the multiple IMS Core sites and PEs of each other IMS Core site of the multiple IMS Core sites to form a full mesh. A TE LSP network path is configured between a PE of each IMS Core site and PEs of each other IMS Core site. A full mesh refers to a mesh topology in which a PE of each IMS Core site has a TE LSP connecting it to PEs of each other IMS Core site in the network 600. The full mesh increases the amount of redundancy, and provides for the same kind of quick healing and network QoS between any one IMS Core site and any other IMS Core site. The implementations disclosed herein thus provide a methodology for designing a fast-recovering IMS (VoIP or Unified Communications) network topology. The computer system proceeds to step 716.

The network 600 includes multiple SBCs. SBCs are illustrated and described in more detail with reference to FIG. 2. Each SBC is homed to a PE. PEs are illustrated and described in more detail with reference to FIG. 2. In some implementations, the computer system configures another set of TE LSPs between a PE of each SBC of the multiple SBCs and PEs of each IMS Core site of the multiple IMS Core sites responsive to determining that the network includes the multiple IMS Core sites. For example, in step 716, the computer system configures a TE LSP between each SBC-PE of the network 600 and PEs of each IMS Core site that the SBC-PE is configured to use, for example, for call signaling. The computer system proceeds to step 720. In step 720, the computer system configures a TE LSP between the PE of each SBC and the PE of each other SBC. The computer system proceeds to step 724. The network 600 includes multiple UEs. UEs are illustrated and described in more detail with reference to FIG. 1. Each UE is homed to a respective PE. In step 724, the computer system configures a TE LSP between the PE of each UE and each SBC-PE that the UE is configured to use for data and control IP traffic.

The computer system proceeds to step 728. In some implementations, the computer system determines that a particular UE of the multiple UEs is connected to a particular SBC of the multiple SBCs by a single link. For example, in step 720, the computer system determines whether a particular UE of the multiple UEs is connected to a particular SBC by a single link. The single link (network path) is part of the set of TE LSPs connecting each UE to each SBC. When the computer system determines that the particular UE is connected to the particular SBC by a single link, the number of TE LSPs can be reduced, thus conserving the use of network and hardware resources. For example, because of the proximity of SBCs to the UE-PEs that they serve, implementations can obviate the need for TE LSP network paths between the UE-PEs and the SBC-PEs, such as, in the case where a UE-PE has only a single link to get to the SBC (SBC-PE). In such cases, the overhead of configuring TE LSPs from the UE-PE to the SBC (SBC-PE) is obviated. The computer system proceeds to step 732. In some implementations, the computer system de-configures a network path (TE LSP) between the particular UE of the multiple UEs and the particular SBC of the multiple SBCs. For example, in step 732, the computer system omits configuring, de-configures, or removes a network path (TE LSP) between the particular UE and the particular SBC.

In step 736, the computer system determines whether the network 600 includes a single IMS Core site. Responsive to determining that the network 600 includes a single IMS Core site, the computer system configures a first set of TE LSPs between each SBC of the multiple SBCs and the single IMS Core site. For example, when the computer system determines that the network 600 includes a single IMS Core site, the computer system proceeds to step 740. In step 740, the computer system configures a set of TE LSPs between each SBC-PE and a PE of the single IMS Core site. In some implementations, each SBC of the multiple SBCs is homed to a PE.

The computer system proceeds to step 744. In some implementations, the computer system configures a (second) set of TE LSPs between a PE of each SBC of the multiple SBCs and PEs of each SBC of the multiple SBCs to form a full mesh. For example, in step 744, the computer system configures a TE LSP between each SBC-PE of the network 600 and each other SBC-PE of the network 600. Thus, a full mesh of TE LSPs is configured between all the SBC-PEs. The computer system proceeds to step 748. In some implementations, the network 600 further includes multiple user endpoints (UEs). The computer system configures a third set of TE LSPs between each UE of the multiple UEs and a PE of an SBC of the multiple SBCs, wherein the UE is configured to use the SBC. For example, in step 748, the computer system configures a TE LSP between each UE-PE and the SBC-PE that the UE-PE is configured to use.

Figure 8:
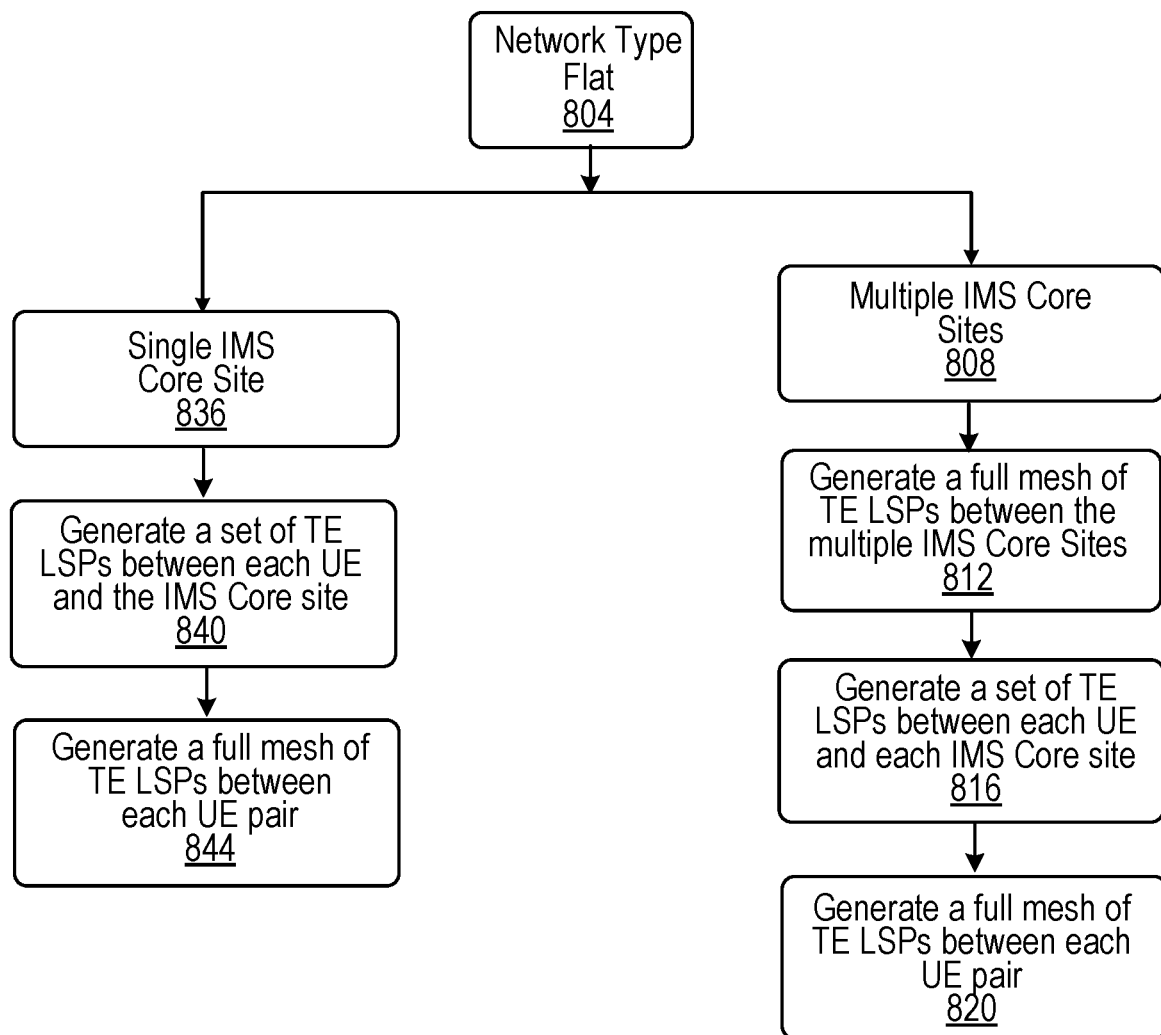
FIG. 8 illustrates a process for MPLS TE design for IMS-based VoIP, in accordance with one or more implementations.

FIG. 8 illustrates a process for MPLS Traffic Engineering design for IMS-based VoIP or Unified Communications, in accordance with one or more implementations. MPLS-enabled networks and IMS Core sites are illustrated and described in more detail with reference to FIG. 2. In some implementations, the process is performed by the computer system illustrated and described in more detail with reference to FIG. 9.

In step 804, the computer determines whether a network type of the network 200 is an MPLS-enabled flat VoIP or Unified Communications network. Flat networks and the network 300 are illustrated and described in more detail with reference to FIGS. 2, 3. When the computer system determines that the network type is an MPLS-enabled flat VoIP or Unified Communications IMS network, the computer system proceeds to step 808. In step 808, the computer system determines whether the network 300 includes multiple, redundant IMS Core sites (e.g., IMS Core sites 350, 354 illustrated and described in more detail with reference to FIG. 3). When the computer system determines that the network 300 includes multiple, redundant IMS Core sites, the computer system proceeds to step 812.

In step 812, the computer system configures a set of TE LSPs between PEs 344, 348 of the multiple, redundant IMS Core sites 350, 354. TE LSPs are illustrated and described in more detail with reference to FIGS. 2, 3. For example, a full mesh is configured. A TE LSP network path is configured between a PE 344 of each IMS Core site 350 and a PE 348 of each other IMS Core site 354. The computer system proceeds to step 816. The implementations disclosed utilize the MPLS Layer-3 VPNs technology to enhance the QoS and redundancy assurances for a 3GPP IMS-based VoIP or Unified Communications network having geographically redundant core call processing sites in an Enterprise network. The implementations benefit from the MPLS TE LPS feature-set. Specific TE LSPs are carved out avoiding weak or undesirable network nodes or links. Specific parameters are not needed to configure the TE LSPs; and parameters satisfying the need of the Enterprise network can be used.

The network 300 includes multiple UEs. UEs are illustrated and described in more detail with reference to FIG. 1. Each UE is homed to a PE. PEs are illustrated and described in more detail with reference to FIG. 2. In step 816, the computer system configures a set of TE LSPs between each UE-PE of the network 300 and PEs of each IMS Core site that the UE-PE is configured to use, for example, for call signaling. The computer system proceeds to step 820. In step 820, the computer system configures multiple TE LSPs between the multiple UE-PEs. For example, a full mesh is configured. A TE LSP network path (for example, the TE LSP 372) is configured between each UE-PE and each other UE-PE.

In step 836, the computer system determines whether the network 300 includes only a single IMS Core site. If the computer system determines that the network 300 includes only a single IMS Core site, the computer system proceeds to step 840. In step 840, the computer system configures a set of TE LSPs between each UE-PE and a PE of the single IMS Core site. The computer system proceeds to step 844. In step 844, the computer system configures a set of TE LSPs between each UE-PE of the network 300 and each other UE-PE of the network 300. Thus, a full mesh of TE LSPs is configured between all the UE-PEs. The implementations disclosed herein thus provide an infrastructure for Unified Communications to integrate enterprise communication services such as instant messaging (chat), presence information, voice (including IP telephony), mobility features (including extension mobility and single number reach), audio, web and video conferencing, fixed-mobile convergence (FMC), desktop sharing, data sharing (including web connected electronic interactive whiteboards), call control and speech recognition with non-real-time communication services such as unified messaging (integrated voicemail, e-mail, SMS and fax). The implementations encompass all forms of communications that are exchanged via a network to include other forms of communications such as Internet Protocol Television (IPTV) and digital signage Communications as they become an integrated part of the network communications deployment and can be either directed as one-to-one communications or broadcast communications from one to many. Further, the implementations enable an individual to send a message on one medium and receive the same communication on another medium. For example, one can receive a voicemail message and choose to access it through e-mail or a cell phone. If the sender is online according to the presence information and currently accepts calls, the response can be sent immediately through text chat or a video call. Otherwise, it may be sent as a non-real-time message that can be accessed through a variety of media.

Figure 9:
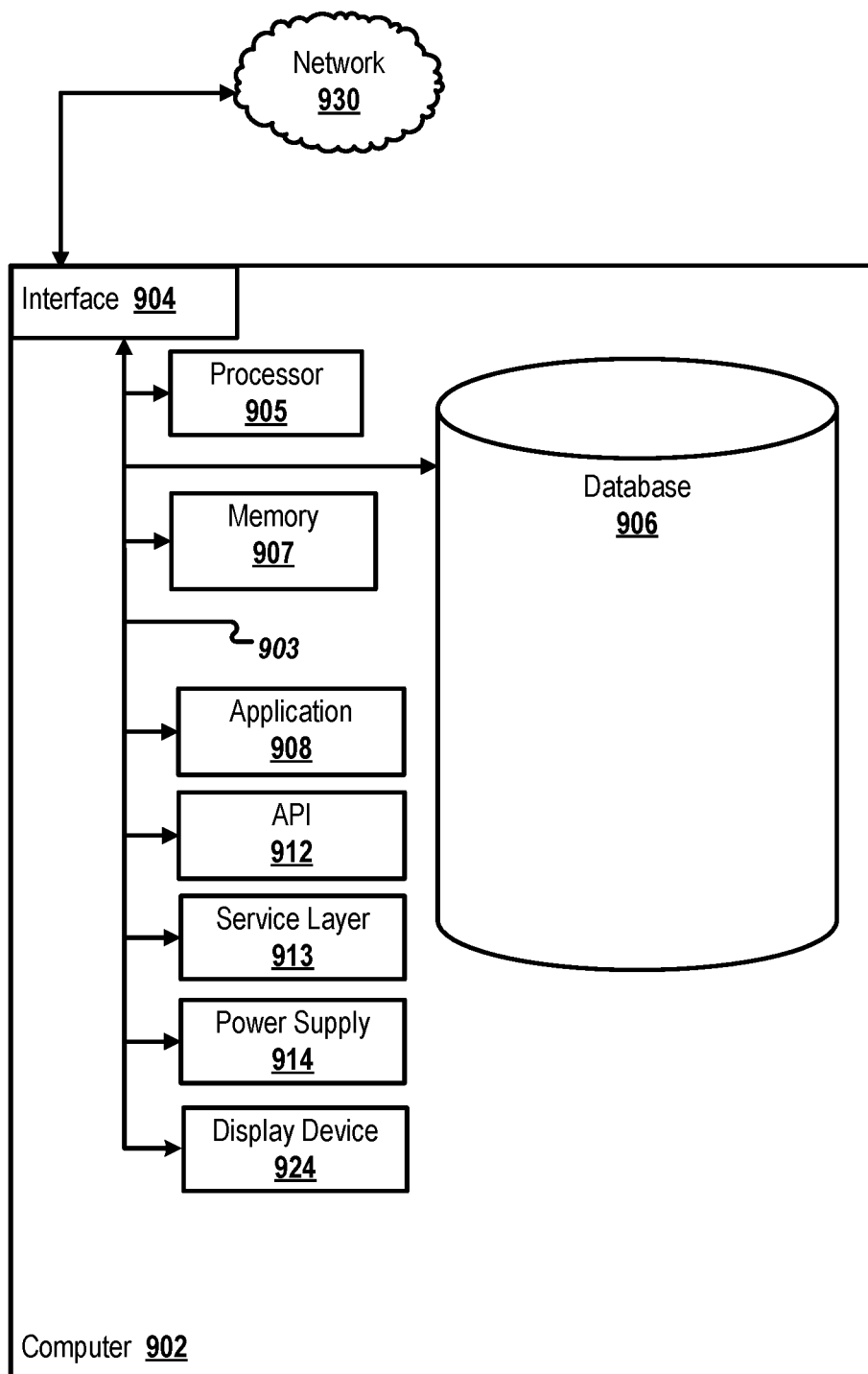
FIG. 9 illustrates an example computer system, in accordance with one or more implementations.

FIG. 9 illustrates an example computer system, in accordance with one or more implementations. In the example implementation, the computer system is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various implementations, the special-purpose computing devices are desktop computer systems, portable computer systems, handheld devices, network devices or any other device that incorporates hard-wired and/or program logic to implement the techniques.

In an implementation, the computer system includes a bus 902 or other communication mechanism for communicating information, and one or more computer hardware processors 908 coupled with the bus 902 for processing information. The hardware processors 908 are, for example, general-purpose microprocessors. The computer system also includes a main memory 906, such as a random-access memory (RAM) or other dynamic storage device, coupled to the bus 902 for storing information and instructions to be executed by processors 908. In one implementation, the main memory 906 is used for storing temporary variables or other intermediate information during execution of instructions to be executed by the processors 908. Such instructions, when stored in non-transitory storage media accessible to the processors 908, render the computer system into a special-purpose machine that is customized to perform the operations specified in the instructions.

In an implementation, the computer system further includes a read only memory (ROM) 99 or other static storage device coupled to the bus 902 for storing static information and instructions for the processors 908. A storage device 912, such as a magnetic disk, optical disk, solid-state drive, or three-dimensional cross point memory is provided and coupled to the bus 902 for storing information and instructions.

In an implementation, the computer system is coupled via the bus 902 to a display 924, such as a cathode ray tube (CRT), a liquid crystal display (LCD), plasma display, light emitting diode (LED) display, or an organic light emitting diode (OLED) display for displaying information to a computer user. An input device 914, including alphanumeric and other keys, is coupled to bus 902 for communicating information and command selections to the processors 908. Another type of user input device is a cursor controller 916, such as a mouse, a trackball, a touch-enabled display, or cursor direction keys for communicating direction information and command selections to the processors 908 and for controlling cursor movement on the display 924. This input device typically has two degrees of freedom in two axes, a first axis (e.g., x-axis) and a second axis (e.g., y-axis), that allows the device to specify positions in a plane.

According to one implementation, the techniques herein are performed by the computer system in response to the processors 908 executing one or more sequences of one or more instructions contained in the main memory 906. Such instructions are read into the main memory 906 from another storage medium, such as the storage device 912. Execution of the sequences of instructions contained in the main memory 906 causes the processors 908 to perform the process steps described herein. In alternative implementations, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 912. Volatile media includes dynamic memory, such as the main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that include the bus 902. Transmission media can also take the form of acoustic or light waves, such as those generated during radio-wave and infrared data communications.

In an implementation, various forms of media are involved in carrying one or more sequences of one or more instructions to the processors 908 for execution. For example, the instructions are initially carried on a magnetic disk or solid-state drive of a remote computer. The remote computer loads the instructions into its dynamic memory and send the instructions over a telephone line using a modem. A modem local to the computer system receives the data on the telephone line and use an infrared transmitter to convert the data to an infrared signal. An infrared detector receives the data carried in the infrared signal and appropriate circuitry places the data on the bus 902. The bus 902 carries the data to the main memory 906, from which processors 908 retrieves and executes the instructions. The instructions received by the main memory 906 can optionally be stored on the storage device 912 either before or after execution by processors 908.

The computer system also includes a communication interface 918 coupled to the bus 902. The communication interface 918 provides a two-way data communication coupling to a network link 920 that is connected to a local network 922. For example, the communication interface 918 is an integrated service digital network (ISDN) card, cable modem, satellite modem, or a modem to provide a data communication connection to a corresponding type of telephone line. As another example, the communication interface 918 is a local area network (LAN) card to provide a data communication connection to a compatible LAN. In some implementations, wireless links are also implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 provides a connection through the local network 922 to a host computer 924 or to a cloud data center or equipment operated by an Internet Service Provider (ISP) 926. The ISP 926 in turn provides data communication services through the world-wide packet data communication network now commonly referred to as the "Internet" 928. The local network 922 and Internet 928 both use electrical, electromagnetic or optical signals that carry digital data streams. The signals through the various networks and the signals on the network link 920 and through the communication interface 918, which carry the digital data to and from the computer system, are example forms of transmission media.

The computer system sends messages and receives data, including program code, through the network(s), the network link 920, and the communication interface 918. In an implementation, the computer system receives code for processing. The received code is executed by the processors 908 as it is received, and/or stored in storage device 912, or other non-volatile storage for later execution.

Figure 10:
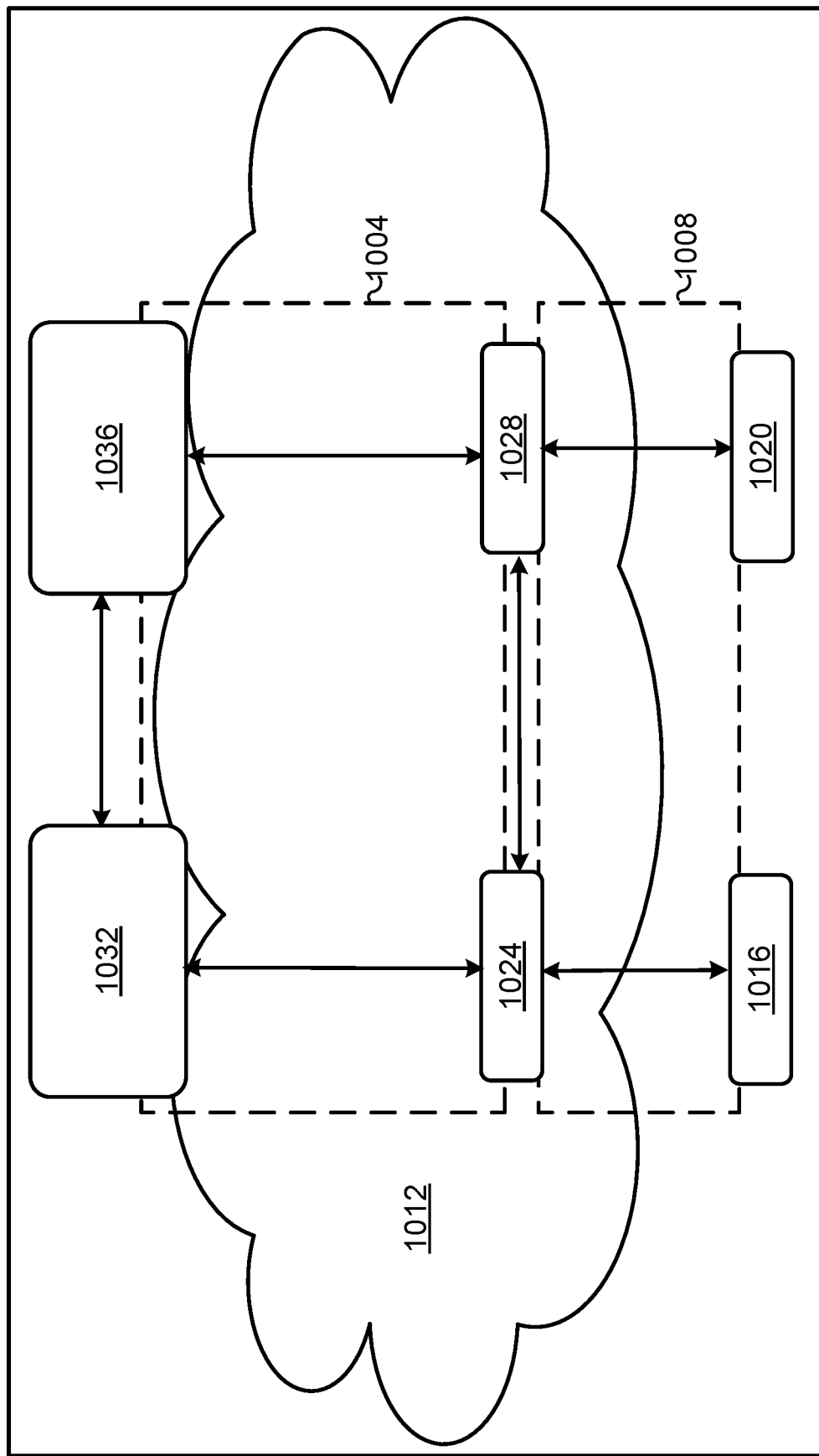
FIG. 10 illustrates an example Core Side network and Access Side network, in accordance with one or more implementations.

FIG. 10 illustrates an example Core Side network 1004 and Access Side network 1008, in accordance with one or more implementations. FIG. 10 shows an MPLS-enabled layer3 VPN network 1012. Two UEs (UE 1016 and UE 1020) are used as endpoints for network paths. UEs are illustrated and described in more detail with reference to FIG. 1. As described in more detail with reference to FIG. 3, the network paths (TE LSPs) are configured from PEs that each UE 1016, 1020 is homed to. TE LSPs and PEs are illustrated and described in more detail with reference to FIG. 2. The network 1008 between the UEs 1016, 1020 and the SBCs (SBC 1024 and SBC 1028) illustrated in FIG. 10 is denoted as a Layer1 Access Side network 1008. SBCs are illustrated and described in more detail with reference to FIG. 4. The network 1004 between the SBCs 1024, 1028 and the two IMS Core sites (IMS Core site 1032 and IMS Core Site 1036) is denoted as a Layer2 Core Side network 1004.

The IMS Core sites 1032, 1036 can also function as Unified Communications application servers. Unified Communications is described in more detail with reference to FIG. 2. As described with reference to FIG. 3, the Access Side layer 1008 is connected to the UEs 1016, 1020. The architecture illustrated in FIG. 10 separates the directional interaction of the UEs 1016, 1020 with the IMS Core sites 1032, 1036, which in turn decreases the total number of TE LSPs required. In the flat network 200 illustrated and described in more detail with reference to FIG. 2, the total number of TE LSPs can grow quickly as the network 200 grows in size. Hence, the implementations shown in FIG. 10 create two levels in the hierarchy: level 1008 below the SBCs 1024, 1028 ("Access Network side") and level 1004 above the SBCs ("Core Network side"). In such implementations, the UEs 1016, 1020 communicate only with the SBCs 1024, 1028, while the SBCs 1024, 1028 communicate with the rest of the IMS network 1012 and other SBCs.

What is claimed is:

1. A method comprising:
    determining, by a computer system, that a network is a flat Multiprotocol Label Switching (MPLS)-enabled Voice over Internet Protocol (VoIP) network comprising an IP Multimedia Subsystem (IMS) Core site and excluding Session Border Controllers (SBCs), the network further comprising a plurality of user endpoints (UEs);
    responsive to determining that the network is the flat MPLS-enabled VoIP network, configuring, by the computer system, a first set of Traffic Engineering (TE) Label Switching Paths (LSPs) between each UE of the plurality of UEs and the IMS Core site, wherein each UE communicates directly with the IMS core site using the first set of TE LSPs;
    configuring, by the computer system, a second set of TE LSPs between each UE of the plurality of UEs and each other UE of the plurality of UEs to form a full mesh, wherein each UE communicates directly with the each other UE of the plurality of UEs using the second set of TE LSPs; and
    generating, by a display device of the computer system, a graphical representation of the network, the graphical representation representing the first set of TE LSPs and the second set of TE LSPs connecting each UE of the plurality of UEs.

2. The method of claim 1, further comprising:
    determining, by the computer system, that the network comprises a plurality of IMS Core sites including the IMS Core site; and
    responsive to determining that the network comprises the plurality of IMS Core sites, configuring, by the computer system, a third set of TE LSPs between each IMS Core site of the plurality of IMS Core Sites and each other IMS Core site of the plurality of IMS Core sites to form a second full mesh.

3. The method of claim 2, further comprising configuring, by the computer system, a fourth set of TE LSPs between each UE of the plurality of UEs and each IMS Core site of the plurality of IMS Core sites.

4. The method of claim 1, further comprising receiving, by the computer system, a specified latency, induced jitter, and number of hops for a particular traffic type across the network, wherein the first set of TE LSPs and the second set of TE LSPs are configured to support the specified latency, induced jitter, and number of hops.

5. The method of claim 4, wherein at least one UE of the plurality of UEs is a mobile device and the particular traffic type comprises VoIP data or Unified Communications data.

6. The method of claim 1, further comprising directing, by the computer system, data from a first UE of the plurality of UEs to a second UE of the plurality of UEs using a path label indicating the second set of TE LSPs.

7. The method of claim 1, wherein each UE of the plurality of UEs is homed to a respective first provider edge (PE) and the IMS Core site is homed to a second PE, and wherein configuring the first set of TE LSPs comprises connecting, by the computer system, the first set of TE LSPs between the respective first PE of each UE of the plurality of UEs and the second PE of the IMS Core site.

8. A non-transitory computer-readable storage medium storing instructions executable by one or more computer processors, the instructions when executed by the one or more computer processors cause the one or more computer processors to:
  determine that a network is a flat Multiprotocol Label Switching (MPLS)-enabled Voice over Internet Protocol (VoIP) network comprising an IP Multimedia Subsystem (IMS) Core site and excluding Session Border Controllers (SBCs), the network further comprising a plurality of user endpoints (UEs);
  responsive to determining that the network is the flat MPLS-enabled VoIP network, configure a first set of Traffic Engineering (TE) Label Switching Paths (LSPs) between each UE of the plurality of UEs and the IMS Core site, wherein each UE communicates directly with the IMS core site using the first set of TE LSPs;
  configure a second set of TE LSPs between each UE of the plurality of UEs and each other UE of the plurality of UEs to form a full mesh, wherein each UE communicates directly with the each other UE of the plurality of UEs using the second set of TE LSPs; and
  generate, by a display device of a computer system, a graphical representation of the network, the graphical representation representing the first set of TE LSPs and the second set of TE LSPs connecting each UE of the plurality of UEs.

9. The non-transitory computer-readable storage medium of claim 8, wherein the instructions when executed by the one or more computer processors further cause the one or more computer processors to:
  determine that the network comprises a plurality of IMS Core sites including the IMS Core site; and
  responsive to determining that the network comprises the plurality of IMS Core sites, configure a third set of TE LSPs between each IMS Core site of the plurality of IMS Core Sites and each other IMS Core site of the plurality of IMS Core Sites to form a second full mesh.

10. The non-transitory computer-readable storage medium of claim 9, wherein the instructions when executed by the one or more computer processors further cause the one or more computer processors to configure a fourth set of TE LSPs between each UE of the plurality of UEs and each IMS Core site of the plurality of IMS Core Sites.

11. The non-transitory computer-readable storage medium of claim 8, wherein the instructions when executed by the one or more computer processors further cause the one or more computer processors to receive a specified latency, induced jitter, and number of hops for a particular traffic type across the network, wherein the first set of TE LSPs and the second set of TE LSPs are configured to support the specified latency, induced jitter, and number of hops.

12. The non-transitory computer-readable storage medium of claim 11, wherein at least one UE of the plurality of UEs is a mobile device and the particular traffic type comprises VoIP data or Unified Communications data.

13. The non-transitory computer-readable storage medium of claim 8, wherein the instructions when executed by the one or more computer processors further cause the one or more computer processors to direct data from a first UE of the plurality of UEs to a second UE of the plurality of UEs using a path label indicating the second set of TE LSPs.

14. The non-transitory computer-readable storage medium of claim 8, wherein each UE of the plurality of UEs is homed to a respective first provider edge (PE) and the IMS Core site is homed to a second PE, and wherein configuring the first set of TE LSPs comprises connecting, by the computer system, the first set of TE LSPs between the respective first PE of each UE of the plurality of UEs and the second PE of the IMS Core site.

15. A computer system comprising:
  one or more computer processors; and
  a non-transitory computer-readable storage medium storing instructions executable by the one or more computer processors, the instructions when executed by the one or more computer processors cause the one or more computer processors to:
    determine that a network is a flat Multiprotocol Label Switching (MPLS)-enabled Voice over Internet Protocol (VoIP) or Unified Communications IMS network comprising an IP Multimedia Subsystem (IMS) Core site and excluding Session Border Controllers (SBCs), the network further comprising a plurality of user endpoints (UEs);
    responsive to determining that the network is the flat MPLS-enabled VoIP network, configure a first set of Traffic Engineering (TE) Label Switching Paths (LSPs) between each UE of the plurality of UEs and the IMS Core site, wherein each UE communicates directly with the IMS core site using the first set of TE LSPs;
    configure a second set of TE LSPs between each UE of the plurality of UEs and each other UE of the plurality of UEs to form a full mesh, wherein each UE communicates directly with the each other UE of the plurality of UEs using the second set of TE LSPs; and
    generate, by a display device of computer system, a graphical representation of the network, the graphical representation representing the first set of TE LSPs and the second set of TE LSPs connecting each UE of the plurality of UEs.

16. The computer system of claim 15, wherein the instructions when executed by the one or more computer processors further cause the one or more computer processors to:
  determine that the network comprises a plurality of IMS Core sites including the IMS Core site; and
  responsive to determining that the network comprises the plurality of IMS Core sites, configure a third set of TE LSPs between each IMS Core site of the plurality of IMS Core sites and each other IMS Core site of the plurality of IMS Core sites to form a second full mesh.

17. The computer system of claim 16, wherein the instructions when executed by the one or more computer processors further cause the one or more computer processors to configure a fourth set of TE LSPs between each UE of the plurality of UEs and each IMS Core site of the plurality of IMS Core sites.

18. The computer system of claim 15, wherein the instructions when executed by the one or more computer processors further cause the one or more computer processors to receive a specified latency, induced jitter, and number of hops for a particular traffic type across the network, wherein the first set of TE LSPs and the second set of TE LSPs are configured to support the specified latency, induced jitter, and number of hops.

19. The computer system of claim 18, wherein at least one UE of the plurality of UEs is a mobile device and the particular traffic type comprises VoIP data or Unified Communications data.

20. The computer system of claim 15, wherein the instructions when executed by the one or more computer processors further cause the one or more computer processors to direct data from a first UE of the plurality of UEs to a second UE of the plurality of UEs using a path label indicating the second set of TE LSPs.

\* \* \* \* \*